United States Patent [19]

Carrigan et al.

[11] Patent Number: 5,121,993
[45] Date of Patent: Jun. 16, 1992

[54] TRIAXIAL THERMOPILE ARRAY GEO-HEAT-FLOW SENSOR

[75] Inventors: Charles R. Carrigan, Tracy, Calif.; Harry C. Hardee, Albuquerque, N. Mex.; Gerald D. Reynolds, Tijeras, N. Mex.; Terry D. Steinfort, Tijeras, N. Mex.

[73] Assignee: The United States of America as represented by the Department of Energy, Washington, D.C.

[21] Appl. No.: 516,399
[22] Filed: Apr. 30, 1990
[51] Int. Cl.$^5$ .................. G01K 13/00; G01N 25/20
[52] U.S. Cl. ..................... 374/29; 73/154; 374/43; 374/136
[58] Field of Search ............. 374/29, 30, 43, 136, 374/10, 12, 134, 112; 73/154

[56] References Cited

U.S. PATENT DOCUMENTS

| | | | |
|---|---|---|---|
| 2,676,489 | 4/1954 | Basham | 374/112 |
| 3,263,485 | 8/1966 | Mahmoode | 374/112 X |
| 3,363,457 | 1/1968 | Ruehle et al. | 73/154 |
| 3,410,136 | 11/1968 | Johns et al. | 374/112 X |
| 3,656,344 | 4/1972 | Johns | 73/154 |
| 3,668,927 | 6/1972 | Howell et al. | 73/154 |
| 3,745,822 | 7/1973 | Pierce et al. | 73/154 |
| 3,808,889 | 5/1974 | Rawson et al. | 374/134 X |
| 3,864,969 | 2/1975 | Smith, Jr. | 73/154 |
| 3,874,232 | 4/1975 | Hardison | 73/154 |
| 3,880,234 | 4/1975 | Showalter et al. | 166/251 |
| 3,892,128 | 7/1975 | Smith, Jr. | 73/154 |
| 3,986,393 | 10/1976 | Hawley | 73/154 |
| 4,050,302 | 9/1977 | Haupin | 73/190 H |
| 4,109,717 | 8/1978 | Cooke, Jr. | 166/250 |
| 4,366,714 | 1/1983 | Adorni | 73/708 |
| 4,417,470 | 11/1983 | McCraken et al. | 73/154 |
| 4,420,974 | 12/1983 | Lord | 73/154 |
| 4,469,451 | 9/1984 | Kunetka et al. | 374/136 |
| 4,483,195 | 11/1984 | Brown et al. | 73/702 |
| 4,537,067 | 8/1985 | Sharp et al. | 374/136 X |
| 4,553,852 | 11/1985 | Derderian et al. | 374/43 X |
| 4,575,261 | 3/1986 | Berger et al. | 374/136 |
| 4,616,705 | 10/1986 | Stegemeier et al. | 166/250 |
| 4,647,221 | 3/1987 | Szabo | 374/30 X |
| 4,684,265 | 8/1987 | Bourrelly et al. | 374/30 X |
| 4,832,121 | 5/1989 | Anderson | 73/154 X |

OTHER PUBLICATIONS

H. Carslaw et al., *Conduction of Heat in Solids*, 2nd Ed.,1959, Oxford University Press, Oxford, p. 491.
R. Benseman, "Estimating the Total Heat Output of Natural Thermal Regions", *Journal of Geophysical Research*, vol. 64, No. 8, Aug. 1959, pp. 1057–1062.
J. Bredehoeft et al., "Rates of Vertical Groundwater Movement Estimated From the Earth's Thermal Profile", *Water Resources* Research, vol. 1, No. 2, 1965, pp. 325–328.
A. Lachenbruch et al., "Geothermal Setting and Simple Heat Conduction Models for the Long Valley Caldera", *Journal of Geophysical Research*, vol. 81, No. 5, Feb. 10, 1976, pp. 769–784.
A. Lachenbruch et al., "The Near-Surface Hydrothermal Regime of Long Valley Caldera", *Journal of Geophysical Research*, vol. 81, No. 5, Feb. 10, 1976, pp. 763–768.
J. Dunn et al., "Surface Heat Flow Measurements At the Pubimau Hot Spot", Geophysics, vol. 50, No. 7, Jul. 1985, pp. 1108–1112.

Primary Examiner—Daniel M. Yasich
Attorney, Agent, or Firm—Anne D. Daniel; James H. Chafin; William R. Moser

[57] ABSTRACT

A triaxial thermopile array geothermal heat flow sensor is designed to measure heat flow in three dimensions in a reconstituted or unperturbed subsurface regime. Heat flow can be measured in conductive or permeable convective media. The sensor may be encased in protective pvc tubing and includes a plurality of thermistors and an array of heat flow transducers arranged in a vertical string. The transducers produce voltage proportional to heat flux along the subsurface regime and permit direct measurement of heat flow in the subsurface regime. The presence of the thermistor array permits a comparison to be made between the heat flow estimates obtained from the transducers and heat flow calculated using temperature differences and Fourier's Law. The device is extremely sensitive with an accuracy of less than 0.1 Heat Flow Units (HFU) and may be used for long term readings.

3 Claims, 4 Drawing Sheets

TRIAXIAL THERMOPILE ARRAY GEO-HEAT-FLOW SENSOR

The Government has rights in this invention pursuant to contract No. DE-AC04-76DP00789 awarded by the U.S. Department of Energy to AT&T Technologies, Inc.

BACKGROUND OF THE INVENTION

1. Field of the Invention

The invention relates to an apparatus and method for measuring heat-flow in three dimensions in the subsurface regime. More particularly, it relates to a triaxial thermopile array apparatus and method for its use wherein the apparatus includes an array of oriented heat flow transducers and, optionally, an array of thermistors which are buried in a location so as to provide for measurement of transducer voltages and thermistor resistances in order to determine heat flow in three dimensions.

2. Background of the Invention

Information about heat transfer in the subsurface regime is important for assessing potential sites for geothermal power plants. Subsurface heat transfer is also indicative of groundwater flows which must be studied for their contamination by and their possible effect on existing and proposed chemical and nuclear waste repositories.

Previous methods of measuring heat flow have depended upon temperature measurements taken at various levels in boreholes. From the temperature gradients thus obtained and Fourier's law for heat conduction, estimates of heat flow can be obtained. There are, however, severe complications associated with using temperature differences in a borehole to estimate heat flow. First, temperature differences in a borehole give estimates of heat flow along one axis only, i.e., along the borehole. Second, if groundwater flow is present, most of the heat may be transported by convection causing either measurable temperature differences to vanish and/or Fourier's law to be inapplicable. Third, if hydrologic flows are present, heat transfer in and around the borehole may not be indicative of heat transfer at some distance from the borehole in the porous regime.

U.S. Pat. No. 4,420,974 (to Lord) discloses an in-situ measurement system which involves using a series of rigid reinforcing bars having an open loop or "hairpin" configuration as temperature sensors. The device disclosed by Lord depends on the rather weak variation of electrical resistance with temperature in "rebar" to measure in-situ temperatures over large depth intervals (20 ft or more) in a borehole. The design and technique disclosed by Lord are not adequate or appropriate for measuring interborehole temperature differences of the minuscule magnitude associated with geothermal gradients. This lack of sensitivity means that typical geothermal horizontal temperature gradients cannot be reliably measured using the device. The measurement device requires current to be passed through the "rebar" sensors. Using the voltage-current information from the device disclosed by Lord, it is calculated that ohmic heating in the "rebar" will swamp much smaller geothermal heat flows. The rebar sensors in this device are in contact with grout, and electrical leakage into surrounding groundwater that is likely to penetrate the grouting can have a larger effect on measured voltages than the small temperature variations associated with geothermal heat flows.

U.S. Pat. No. 3,874,232 (to Hardison) discloses a device which uses thermistors or thermocouples clamped in a borehole to obtain temperature differences along the borehole length. This device uses the open borehole approach which is subject to interpretive errors. The measurement system disclosed by Hardison yields information about vertical heat flows only, since only vertical temperature gradients are measured using this system.

Thus, both the devices disclosed by the Lord '974 and Hardison '232 patents fail to overcome the aforementioned problems including failure to measure temperature differences along more than one axis and failure to take into account groundwater flows as well as hydrologic flows.

Heat flow sensors, such as heat flow transducers, have been employed for measuring near surface vertical heat flow in geothermal regions. Dunn et al, "Surface heat flow measurements at the Puhimau hot spot," *Geophysics*, Vol. 50, No. 7, July 1985, pp. 1108-1112. However, prior to the present invention, triaxial measurements of geothermal heat flow using heat flow transducers have not yet been attempted.

SUMMARY OF THE INVENTION

Accordingly, it is an object of the present invention to permit measurement of heat flow in three dimensions in the subsurface regime.

Further, it is an object of the present invention to detect groundwater flows which must be studied for their pollution causing interactions with existing and proposed chemical and nuclear waste repositories.

Further yet, it is an object of the present invention to permit accurate study of subsurface heat flow in order to assess potential sites for geothermal power plants.

It is yet another object of the present invention to permit measurement of heat flow in the subsurface regime while eliminating the problems associated with using only temperature differences in a borehole.

Further still, it is an object of the invention to permit heat flow measurement so as to take into account groundwater and hydrologic flows.

These objects and others are fulfilled in accordance with the present invention by providing a triaxial thermopile array device for measuring geothermal heat flow in three dimensions which includes a transducer array comprising a plurality of oriented heat flow transducer pods which are electrically connected to a surface electrical detection apparatus; a thermistor array operatively connected to the transducer array, wherein the thermistor array includes a plurality of thermistor elements which are electrically connected to a surface electrical detection apparatus, and wherein the transducer and thermistor arrays are buried in a subsurface regime; and a surface electrical detection apparatus electrically connected to the transducer and thermistor arrays for measuring heat flow transducer voltages and thermistor element resistances which are used to measure geothermal heat flow in three dimensions in the subsurface regime. The present invention further provides a method of measuring geothermal heat flow in three dimensions which includes burying the triaxial thermopile array in a subsurface regime, detecting heat flow transducer voltages and thermistor element resistances, comparing heat flow estimates obtained from the heat flow transducers and heat flow calculated using temperature differences and Fourier's Law, and determining geothermal heat flow in three dimensions based on the above results.

The device of the present invention can function over a large volume of the subsurface regime for use as a heat flow measuring device which can also be used to detect and quantify groundwater flows. Heat flow can be measured in conductive or permeable convective media. The sensor may be encased in protective plastic tubing and includes a plurality of thermistors and heat flow transducers which may be arranged in a vertical string. The transducers produce a voltage proportional to the heat flow through them and the surrounding subsurface regime and thereby permit direct measurement of heat flow in that subsurface regime. The presence of the thermistor array permits a comparison to be made between the heat flow values obtained from the transducers and heat flow calculated using temperature differences and Fourier's Law. The device is extremely sensitive with an accuracy of less than 0.1 Heat Flow Units (one HFU=42 mW/m$^2$) and may be used for long term readings.

The present invention will become more fully understood from the detailed description given hereinbelow and the accompanying drawings which are given by way of illustration only, and thus are not limitative of the present invention.

BRIEF DESCRIPTION OF THE DRAWINGS

The accompanying drawings, which are incorporated in and form part of the specification, illustrate a preferred embodiment of the invention and, together with the description below, serve to explain the principle of the invention. In the drawings.

DESCRIPTION OF PREFERRED EMBODIMENT

Figure 1:
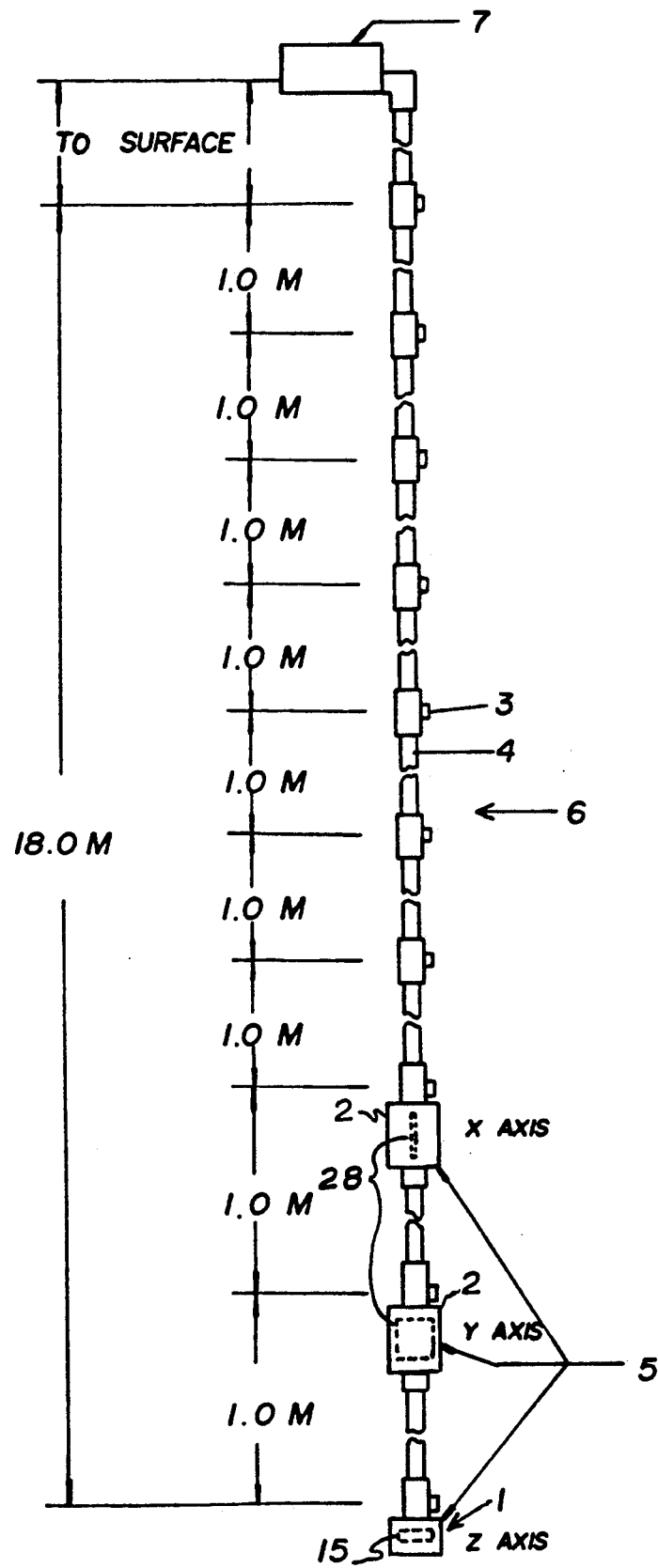
FIG. 1 shows a schematic of the entire assembly showing three heat flow transducer pods, a plurality of thermistor elements and a control box.

Referring more particularly to the drawings, there is shown in FIG. 1 a schematic representation of one preferred embodiment of the triaxial thermopile array device 6 of the present invention buried in a shallow hole at a fixed location. Heat flow transducer pods 5 at the bottom contain triaxially oriented heat flow transducer pads shown with broken lines 28 in the two upper pods and broken line 15 in the lowermost pod. Heat flow transducer pods 28 are positioned in vertically oriented planes which intersect in a right angle so as to provide heat flow measurements in horizontal directions along respective x and y axes. The thermistor elements 3 are arranged in a vertical array with tubing 4. The thermistor elements may be spaced at regular intervals, such as about one meter intervals, along the length of the device. To minimize the possibility of damage by groundwater, the transducers, thermistors, and electrical connections may be encased in a protective material, such as plastic tubing, and preferably pvc tubing, as shown in FIG. 1. An electrical detection apparatus 7 on the surface is electrically connected to each of the heat flow transducer pads and each of the thermistor elements 3 by an appropriate means, such as a rotary selector switch. The apparatus 7 permits measurement of transducer voltages and thermistor resistances in order to ultimately measure heat flow.

The electrical detection apparatus in the schematic diagram of FIG. 1 may be a switch box connected to a standard electrical instrument for reading and recording electrical voltage and resistance. The electrical resistance reading instrument, which is attached to each of the thermistors, can be used to calculate temperature differences along the vertical axis of the embodiment shown in FIG. 1 using Fourier's Law. The conventional sensitive volt meter is calibrated to provide a direct indication of the heat flux or heat flow in response to its respective output voltage from the heat flow pads.

Figure 2:
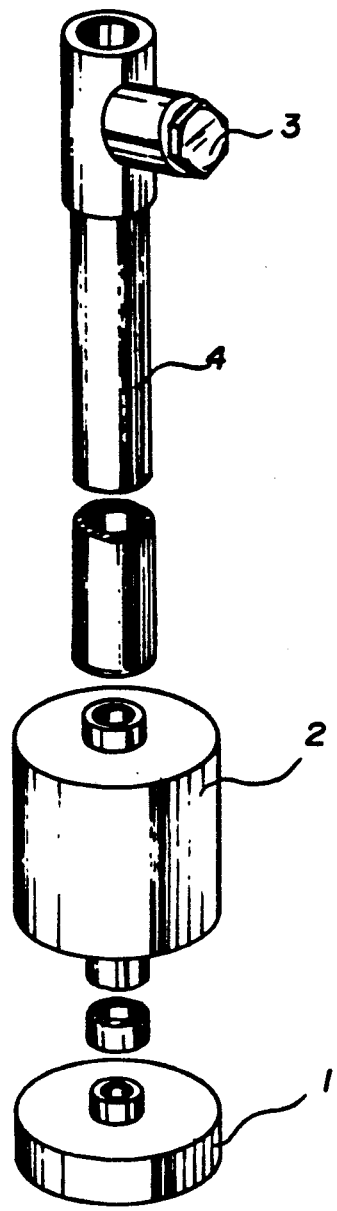
FIG. 2 shows the basic components of the triaxial thermopile array of the present invention which includes a thermistor element, and long and short cylindrical modules which house heat flow transducer pads.

FIG. 2 shows one preferred embodiment of a one segment interval of the triaxial thermopile array device as shown in FIG. 1 which includes a thermistor element 3 attached at the bottom end of a one meter length of cylindrical pvc tubing 4. The thermistor elements are arranged with tubing in a vertical array in order to measure temperature gradients along the vertical axis of the device. A long cylindrical module 2 which contains a transducer pad mounted to detect horizontal heat flow and a short cylindrical module 1 which contains a transducer pad mounted to detect vertical heat flow are also shown in FIG. 2. Note that the long and short modules are combined to form a heat flow transducer pod which is capable of detecting changes in heat flow in all directions.

The cylindrical tubing 4 shown in FIG. 2 provides structural support for the device. The tubing has about the same diameter as the inner diameter of the thermistor element so as to permit the tubing to fit snugly therein. The outer diameter of the tubing is such so as to permit the mounting of the long and short modules of the heat flow transducer pods along a vertical axis. Preferably the thermistor elements and transducer pods are encased with pvc plastic and the tubing formed from pvc plastic.

Figure 3:
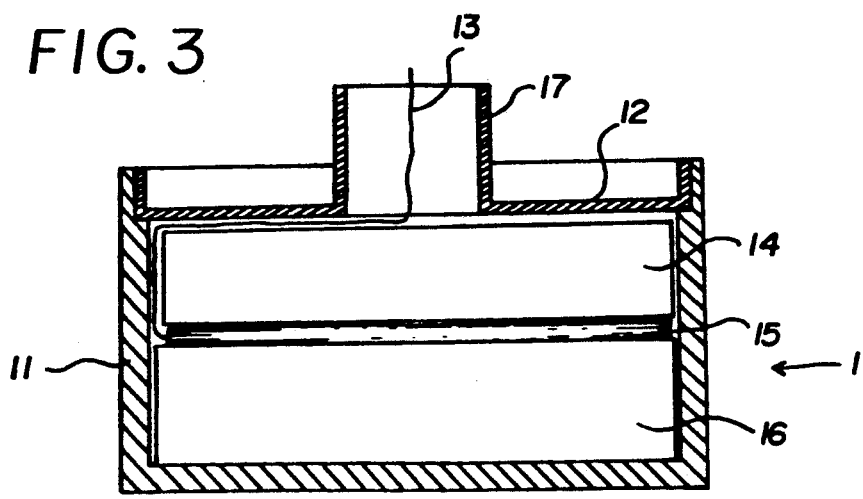
FIG. 3 shows a cut away view of the internal components of the short module including the heat flow transducer pad.

FIG. 3 is a cut away view of the internal components of the short cylindrical module 1 for vertical heat flow detection. The short module includes a cylindrical housing 11 and a housing lid 12 having a Cylindrically shaped joint member 17 extending therefrom for attachment with the long cylindrical module member. The short module further includes electrical wiring 13 electrically connected to a commercial thermopile heat flux sensor, or heat flow transducer pad, available from Hy-Cal or International Thermal Inst. Co. The heat flow pad 15 generates a voltage proportional to the instantaneous heat flux passing through the thermopile sensor. Spacers 14 and 16 are designed to thermally couple the pad 15 to the module housing and surrounding geologic medium. The spacers couple the heat evenly through the thermopile sensor. The spacers are slotted on one edge to allow wiring to pass therethrough and up the pvc tubing to the surface. The short cylindrical module of the heat flow transducer pod detects vertical heat flow.

Figure 4:
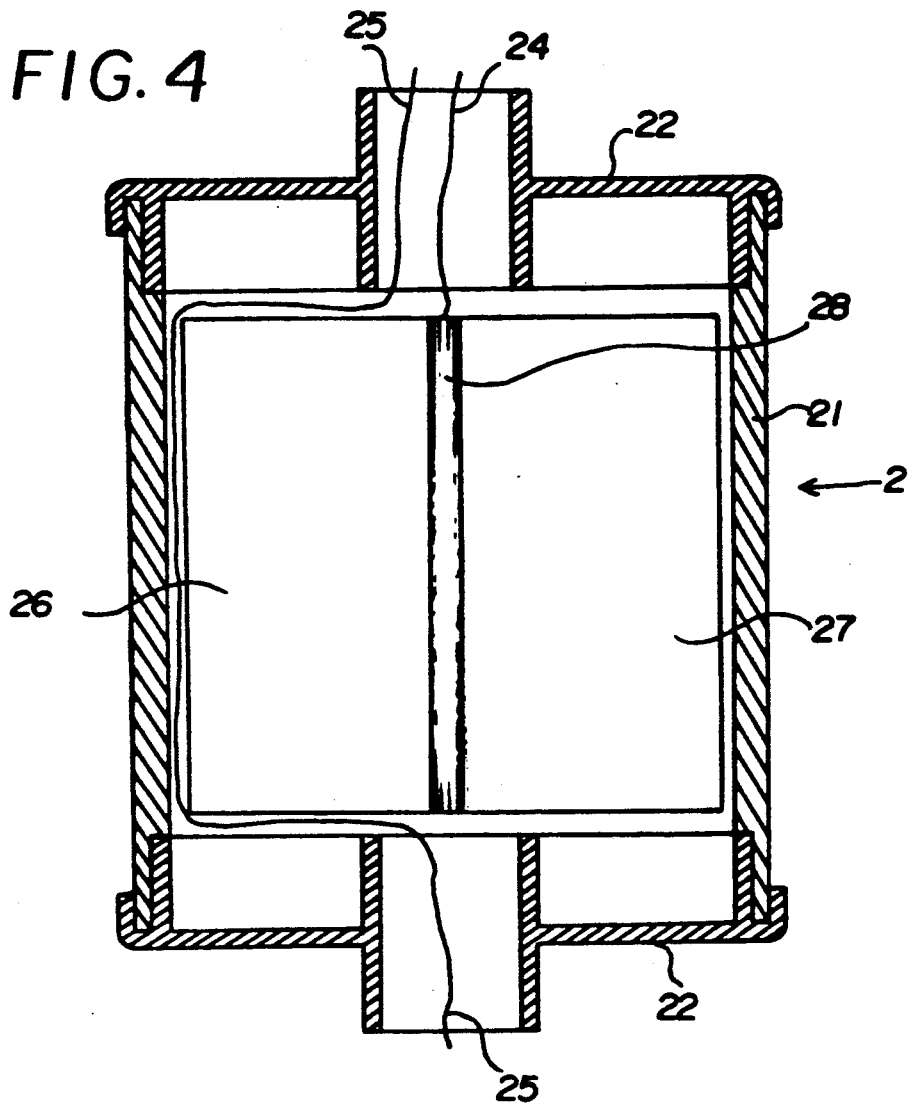
FIG. 4 shows a cut away view of the internal components of the long module including the heat flow transducer pad.

FIG. 4 is a cut away view of the internal components of the long cylindrical module z for horizontal heat flow detection. The long module includes a cylindrical housing 21 and a housing lid 22 which fits thereon. Electrical wiring 24, which is electrically connected to a surface electrical detection apparatus, electrically connects to a vertically disposed heat flow transducer pad 28 which is placed along with spacers 26 and 27 into the housing 21 much the same as described above with regard to the short cylindrical module. Electrical wiring 25 from other elements of the array is also accommodated by the module. The long cylindrical module of the heat flow transducer pod detects horizontal heat flow. Note that as illustrated in FIG. 1, the heat flow pads are oriented along perpendicular x, y and z axes in order to maximize heat flow detecting capabilities.

The heat flow transducer pad employed in the triaxial thermopile array of the present invention is preferably small in size, e.g. with dimensions on the order of a few centimeters, so as to fit in the transducer pod housing. It is preferred that the transducer pad can measure heat flow with a sensitivity of 1 HFU or less. The transducer pad may in one preferred embodiment contain several thousand thermocouple junctions with output voltages connected in series to provide a sensitivity of 0.60 mV per W/m$^2$. Suitable heat flow transducer pads may be obtained from Hy-Cal Engineering of El Monte, California or International Thermal Instrument Company of Del Mar, California.

Figure 5:
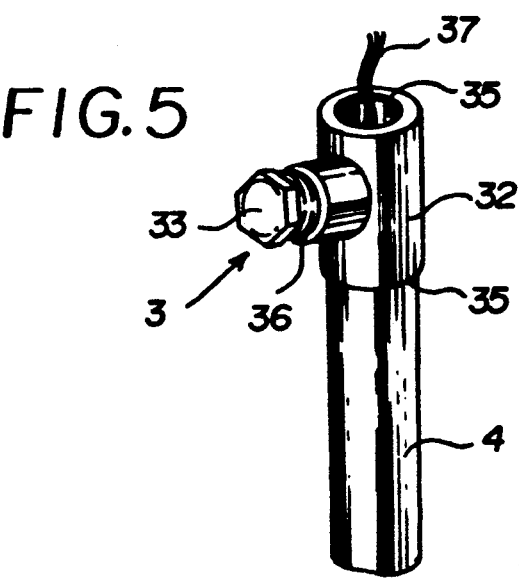
FIG. 5 shows a thermistor mounted on a pvc tee.

FIG. 5 shows a thermistor element 3 including a thermistor cap 33 that is mounted on a T-shaped thermistor housing 32. The T-shaped housing attaches to a length of hollow cylindrical tubing 4. Both tube openings 35 of the T-shaped housing have an inner diameter large enough so as to fit snugly around the length of the hollow tubing 4 which is preferably about one meter in length per segment. The cap opening 36 of the T-shaped housing has an inner diameter large enough so as to fit snugly about the cap 33 which contains the thermistor.

The electrical resistance of the thermistors is sensitive to temperature. The temperature of the local subsurface regime is determined by measuring the thermistor resistance by means of an ohmmeter in the electrical detection apparatus. The resistance measurements taken from each thermistor correspond to the temperature of the thermistor. Thus, with thermistors aligned along the vertical axis, the vertical temperature gradient can be measured based on temperature differences between thermistors. The temperature differences can be used to calculate heat flow by using Fourier's law. This calculation is performed in a manner readily ascertainable to one skilled in the art. The heat flow calculations based on thermistor measurements can be compared to measurements taken by the heat flow transducers in order to estimate groundwater flow. A thermistor preferably employed in the present invention is a diode type thermistor which may be obtained from Fenwal, Inc. of Ashland, Mass. For example, model PT6101 may be used.

To operate the device, the heat flow transducer pods are calibrated in their protective packaging prior to burial so as to permit subsurface measurements to be referenced to known conditions. Laboratory calibration and numerical modeling of heat flows around the pods permit interpretation of the electrical voltages obtained at the field site. The presence of a thermistor array permits a comparison to be made between heat flow estimates obtained from the transducers and heat flow calculated using temperature differences and Fourier's law. Such a comparison is useful in determining what fraction of heat flow is due to groundwater convection and what fraction results from conduction.

EXAMPLE

The triaxial thermopile array device of the present invention, as shown in FIG. 1, was emplaced in the Mojave Desert on the Eastern slope of the Sierra Nevada Range approximately 3.5 miles west of Baker Tower at the China Lake Naval Weapons Center. Tectonically, the location corresponds to the western edge of the basin and range province. The world average heat flow of 1.4 heat flux units (HFU), vertical, and the Sierra Nevada Province average heat flow of about 1-2 HFU were both used for comparison to the resulting measurements.

Since emplacement in April of 1986, three sets of heat flow and temperature measurements have been made. The most recently obtained set of measurements is anomalous and may have been affected by electronic noise present at the test site. The heat flow estimates believed to be accurate obtained from voltage measurements using the heat flow transducer pods are presented in Table 1 below by date of acquisition.

TABLE 1

|  | July 14, 1986 | October 14, 1986 |
| --- | --- | --- |
| axis x: | .49 HFU E [−.036 mv] | .29 HFU E [−.021 mv] |
| axis y: | .35 HFU S [−.022 mv] | .17 HFU S [−.011 mv] |
| axis z: | .27 HFU Vert [+.016 mv] | .27 HFU Vert [+.016 mv] |

These observations indicate the existence of a significant horizontal component of heat flow characterized by time dependence and a more stable value of the vertical heat flow. It is worth noting that the vertical value of heat flow is subnormal for a region in which the average falls between 1 to 2 HFU. The significant horizontal component in conjunction with a subnormal vertical value suggests that ground water flow may be particularly significant in this area.

Figure 6:
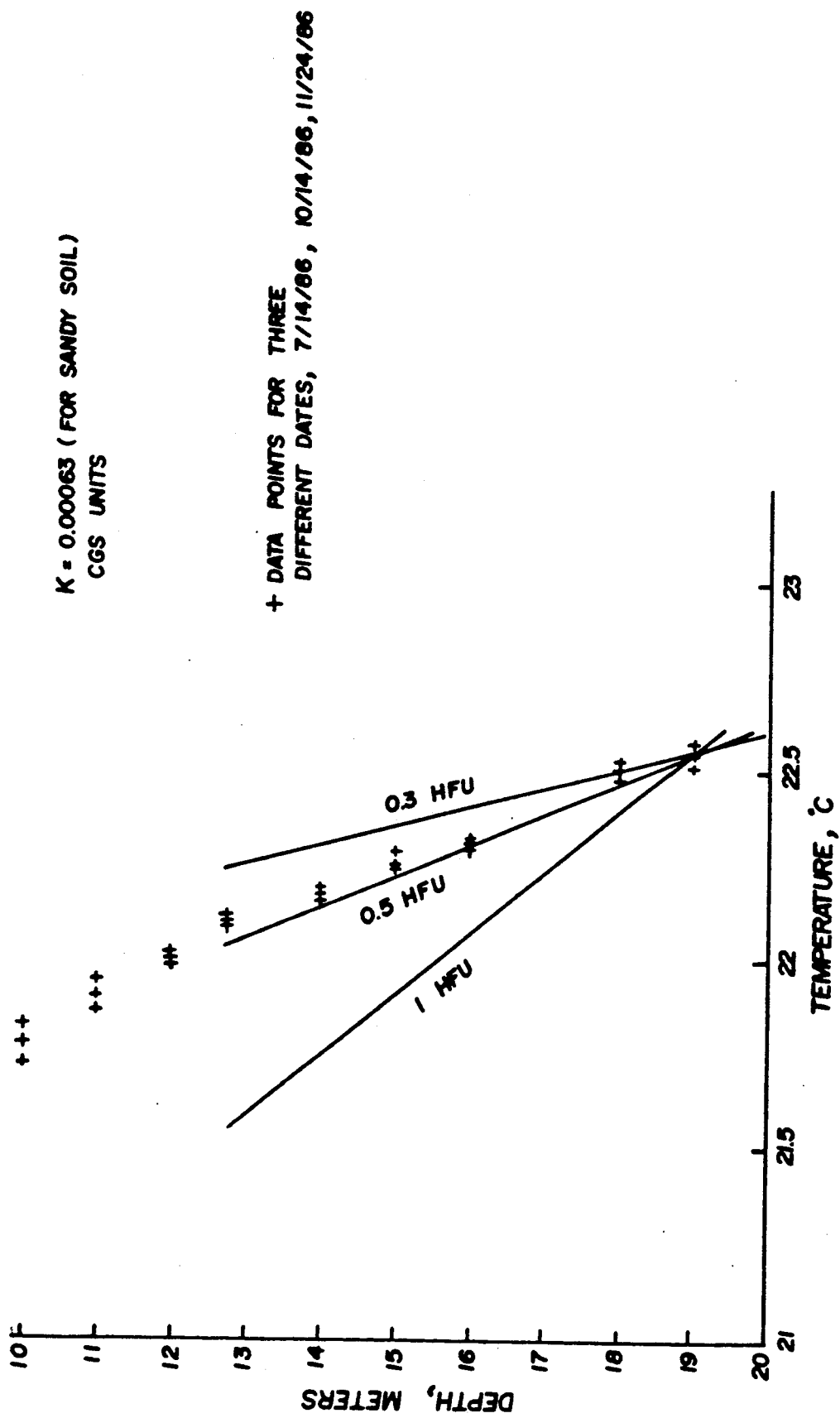
FIG. 6 is a plot of temperature versus depth obtained from measurements described in the Example.

It is possible to test the vertical estimate (axis z) of the heat flow using temperatures obtained from the 10 thermistors located at meter spacings between 10 and 19 meters depth. FIG. 6 is a plot of temperature versus depth obtained from measurements made on Jul. 14, Oct. 14 and Nov. 24. Total error in thermistor calibration and resistance measurement is about ±0.01 C. Seasonal fluctuations in temperature are weak but detectable. By 15 meters, points tend to cluster closely with no further changes due to seasonal effects.

Using a thermal conductivity estimate of 0.00063 cgs, (Carslaw et al, *Conduction of Heat in Solids*, 2nd ed., 1959, Oxford Univ. Press, Oxford), which is appropriate for dry, sandy soil, estimates of temperature gradients appropriate to heat flows of 0.3, 0.5 and 1., HFU have been plotted in FIG. 6 for comparison. The gradient suggested by the temperature observations clearly falls between 0.3 and 0.5 HFU in agreement with the values from the basic heat flow pads translated in Table 1. At the bottom of the plot, the slope is closer to 0.3 HFU. As shown in Table 1, the heat flow module estimates a value of 0.27 HFU for this region of the temperature-depth diagram. The agreement between the temperature and heat flow transducer pods based measurements of heat flow is clearly striking and provides some validation for the concept of making such measurements using the triaxial, thermopile array of the present invention.

In conclusion, the triaxial thermopile array measurements indicate subnormal values of vertical heat flow that are exceeded by the horizontal values. Given the proximity of the site to the Sierra Nevada Range, spring melt runoff may explain the observations. Correlation between thermistor and thermopile array based observations is good and provides evidence of the utility of the TTA for making measurements over a wide range of heat flow.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A triaxial thermopile array device for measuring geothermal heat flow in a subsurface regime in three dimensions which comprises:
    a transducer array buried in said subsurface regime comprising three heat flow transducer pads spaced apart vertically along a longitudinal axis, wherein two of said transducer pads are positioned to measure heat flow in mutually perpendicular horizontal directions and wherein one of said transducer pads is positioned to measure heat flow in the vertical direction, said transducer pads each generating an electrical signal whose voltage is indicative of the heat flow therethrough; and
    means in electrical communication with each of said transducer pads for converting said electrical signals into heat flow values for each of said mutually perpendicular dimensions in said subsurface regime.

2. The device of claim 1 wherein said transducer pads are mounted within cylindrical housings supported on cylindrical tubing which provides structural support for the array and a protected pathway for electrical leads between said transducer pads and said means for converting said electrical signals into heat flow values.

3. The device of claim 2 wherein spacers are provided between said cylindrical housings and said transducer pads to thermally couple said pads to said housings and said subsurface regime.

* * * * *